United States Patent
Nakayama

(10) Patent No.: US 10,442,051 B2
(45) Date of Patent: Oct. 15, 2019

(54) PROCESSING SYSTEM HAVING FUNCTION FOR MAINTAINING PROCESSING ACCURACY

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/138,037

(22) Filed: Sep. 21, 2018

(65) Prior Publication Data

US 2019/0022814 A1    Jan. 24, 2019

Related U.S. Application Data

(63) Continuation of application No. 15/245,349, filed on Aug. 24, 2016, now Pat. No. 10,105,808.

(30) Foreign Application Priority Data

Aug. 31, 2015  (JP) ................................ 2015-170525

(51) Int. Cl.
| | |
|---|---|
| *B23Q 17/09* | (2006.01) |
| *G05B 19/048* | (2006.01) |
| *G05B 23/02* | (2006.01) |
| *B23Q 17/24* | (2006.01) |
| *G05B 19/4065* | (2006.01) |

(52) U.S. Cl.
CPC ..... *B23Q 17/0904* (2013.01); *B23Q 17/0995* (2013.01); *B23Q 17/249* (2013.01); *G05B 19/048* (2013.01); *G05B 19/4065* (2013.01); *G05B 23/0289* (2013.01); *G05B 2219/37256* (2013.01)

(58) Field of Classification Search
None
See application file for complete search history.

(56) References Cited

U.S. PATENT DOCUMENTS

| | | | |
|---|---|---|---|
| 5,219,264 A | 6/1993 | McClure et al. | |
| 8,781,982 B1 * | 7/2014 | Das .......................... | G06E 1/00 706/21 |
| 2006/0276934 A1 * | 12/2006 | Nihei ..................... | B25J 9/1656 700/245 |

FOREIGN PATENT DOCUMENTS

| | | | |
|---|---|---|---|
| CN | 101549468 A | * | 10/2009 |
| CN | 101549468 A | | 10/2009 |
| CN | 102308201 A | | 1/2012 |

(Continued)

*Primary Examiner* — Kenneth M Lo
*Assistant Examiner* — Istiaque Ahmed
(74) *Attorney, Agent, or Firm* — Hauptman Ham, LLP

(57) ABSTRACT

A processing system having a function for appropriately maintaining processing accuracy, without depending on a degree of abrasion of a tool. An unused tool used in a machine tool is captured by using a camera mounted on a robot, so as to obtain a reference image of the tool. Next, an image of the tool is captured after a predetermined number of processing operations carried out. An average amount of tool abrasion per one processing operation is calculated based on the two images, so as to estimate a current amount of tool abrasion. Based on the estimation result and a previously input limit amount of abrasion, the number of remaining possible processing operations of the tool is calculated and output.

7 Claims, 5 Drawing Sheets

(56) References Cited

FOREIGN PATENT DOCUMENTS

| | | | |
|---|---|---|---|
| CN | 103586740 | A | 2/2014 |
| JP | S59-142046 | A | 8/1984 |
| JP | S61-50790 | A | 3/1986 |
| JP | S62-88549 | A | 4/1987 |
| JP | H3-239453 | A | 10/1991 |
| JP | H5-84631 | A | 4/1993 |
| JP | H7-112350 | A | 5/1995 |
| JP | 07156067 | * | 6/1995 |
| JP | H7-156067 | A | 6/1995 |
| JP | H9-85584 | A | 3/1997 |
| JP | H10-96616 | A | 4/1998 |
| JP | H10-118890 | A | 5/1998 |
| JP | 2001-150299 | A | 6/2001 |
| JP | 2002-018680 | A | 1/2002 |
| JP | 2003-58216 | A | 2/2003 |
| JP | 2003-251546 | A | 9/2003 |
| JP | 2004-142015 | A | 5/2004 |
| JP | 2005-5608 | A | 1/2005 |
| JP | 2009-61565 | A | 3/2009 |
| JP | 2010-131685 | A | 6/2010 |
| JP | 2011-11330 | A | 1/2011 |
| JP | 2011-045988 | A | 3/2011 |
| JP | 2012-208921 | A | 10/2012 |
| JP | 2012-223839 | A | 11/2012 |
| JP | 2013-78825 | A | 5/2013 |
| JP | 2014-75050 | A | 4/2014 |

\* cited by examiner

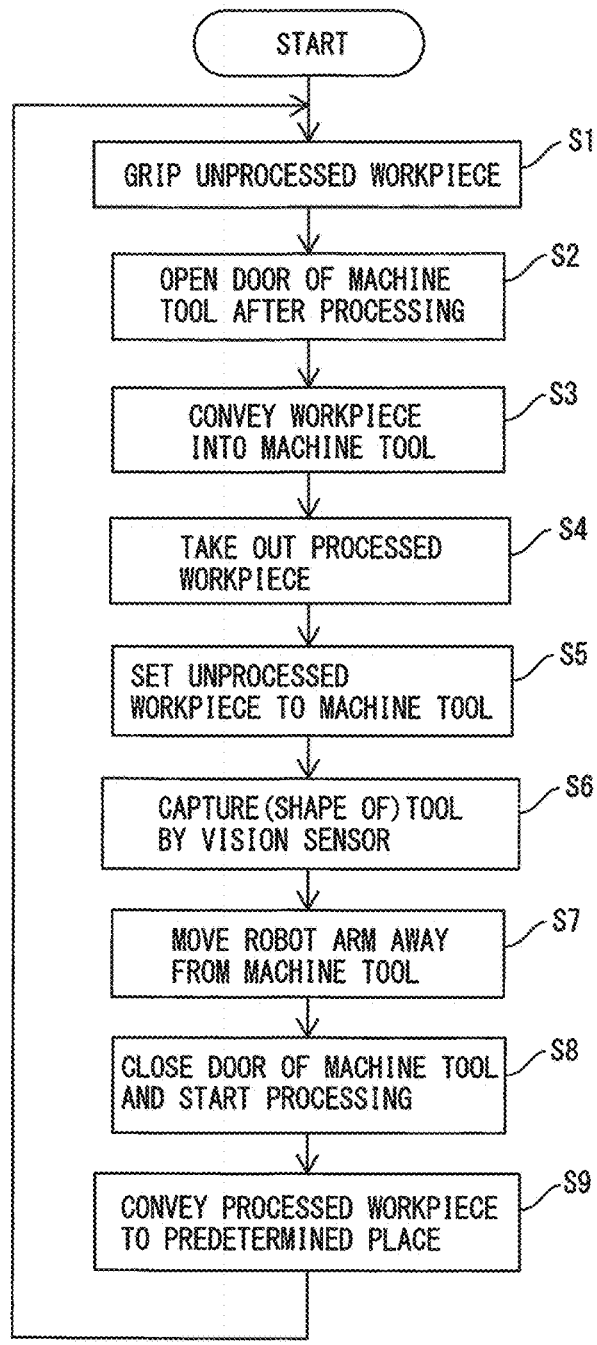

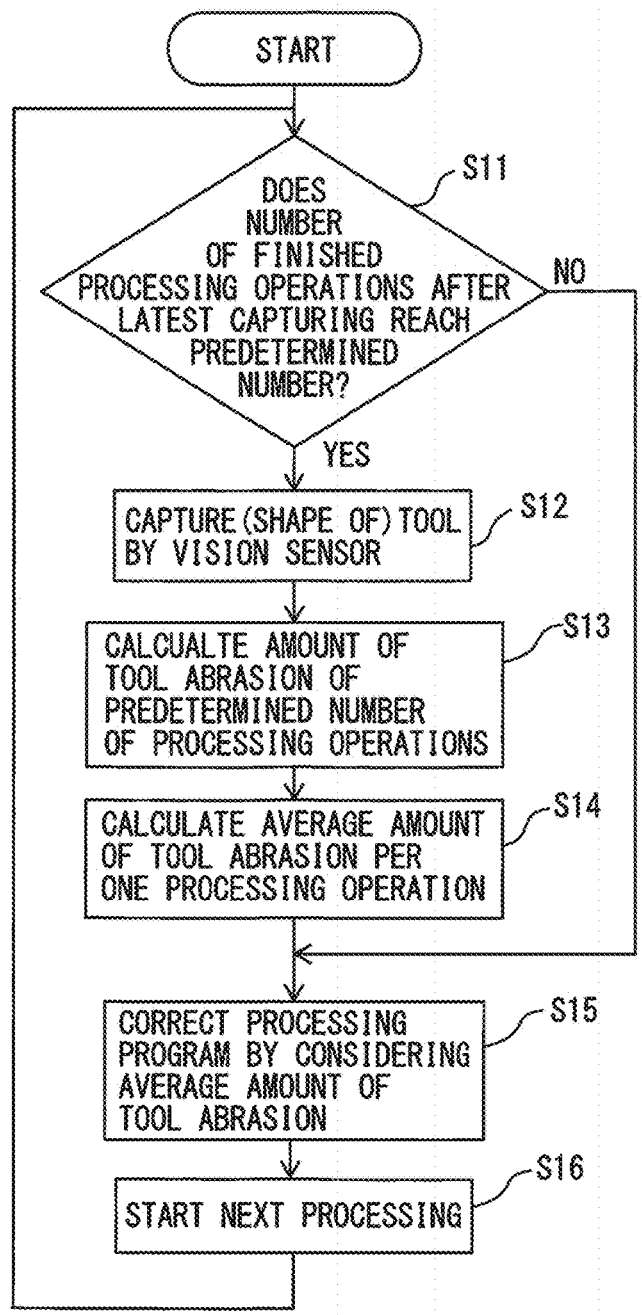

FIG. 4a
FIG. 4b
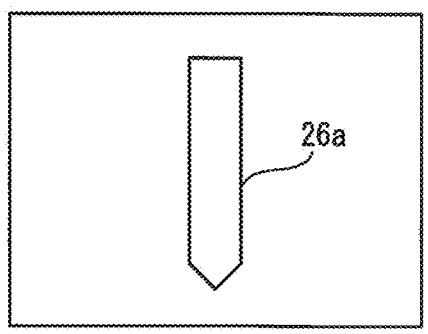
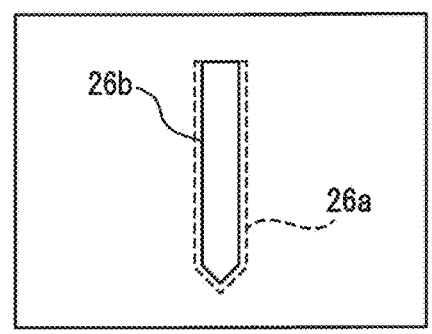

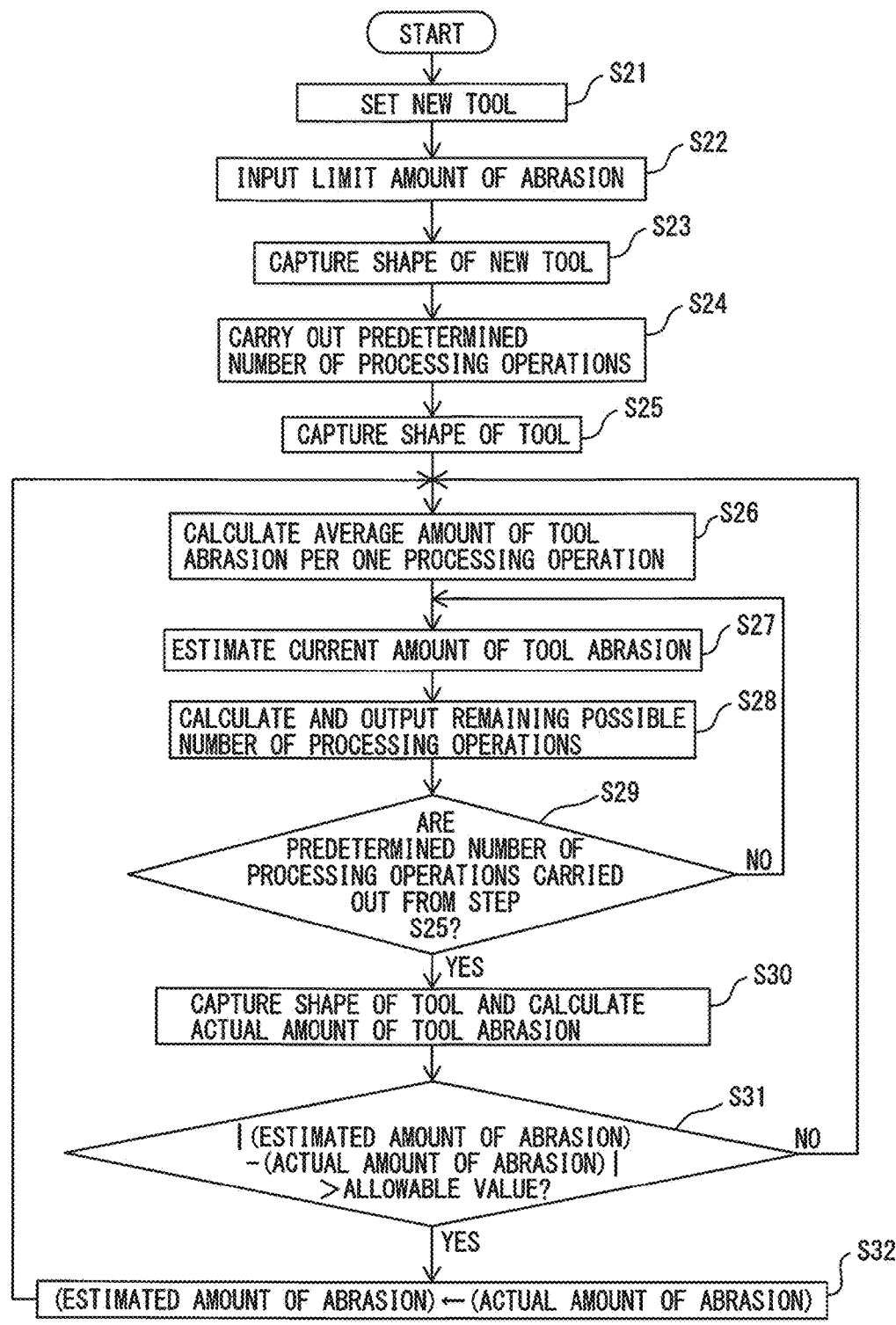

PROCESSING SYSTEM HAVING FUNCTION FOR MAINTAINING PROCESSING ACCURACY

RELATED APPLIATIONS

The present application is a continuation application of U.S. patent application Ser No. 15/245,349, filed on Aug. 24, 2016 claims priority to Japanese Patent Application No. 2015-170525 filed Aug. 31, 2015. The disclosures of all above-listed prior-filed applications are hereby incorporated by reference herein in their entirety.

BACKGROUND OF THE INVENTION

1. Field of the Invention

The preset invention relates to a processing system including a machine tool and a robot, and having a function for maintaining a processing accuracy of the machine tool.

2. Description of the Related Art

In a conventional machine tool, in order to check an abrasion status of a working tool, it is necessary for an operator to measure dimensions, etc., of the working tool. In this regard, the life of the tool varies depending on a cutting condition, and thus it takes many man-hours to check an amount of abrasion with respect to each workpiece or each cutting condition, and correct the next processing program based on the checking result. In fact, in many cases, an upper limit of operating time of the processing tool is determined based on a life of the processing tool experimentally obtained from an operation result at a certain cutting condition, and the processing tool is replaced with a new processing tool when the operating time of the tool reaches the upper limit of operating time.

As relevant prior art documents, JP H09-085584 A discloses a technique to judge as to capture a tool to be used next time by a capture means, identify the tool from a captured tool image data by a tool identifying part, and judge as to whether or not the tool identified by the tool identifying part coincides with a tool previously specified in an NC program.

JP 2002-018680 A discloses a machine tool having a processing tool, a camera for capturing an image of the tool, and an image processing part for judging as to whether or not the tool is damaged based on the image captured by the camera.

JP H10-096616 A discloses a system intended to automatically detect abrasion or breakage of a tool chip attached to a machine tool in a non-contact manner, and describes that the tool tip may be inspected either when the tool is attached to the machine tool or when the tool is removed from the machine tool. In the latter case, by using a robot for moving the tool to an inspection position and a robot for supporting a light projector and an imager of a vision sensor, breakage inspection and exchange of the tool tip can be automated.

JP H07-156067 A discloses a device for correcting an amount of abrasion of a grinding tool of a grinding robot, and describes that, when a grinding wheel contacts an object to be grind at various angles so as to grind the object, an abrasion status of the grinding wheel is directly detected by using a light section image and profile information before and after the abrasion, an amount of abrasion of the grinding wheel is calculated with respect to each inclined posture of the wheel, and a corrected amount of abrasion is calculated corresponding to the amount of abrasion, whereby the grinding position of the wheel during the grinding operation can be precisely corrected.

JP 2014-075050 A discloses a processing system having a measurement robot for measuring the shape of a workpiece, and describes that the measurement robot measures the shape of the next workpiece during the current workpiece is machined by a processing machine, and thus the measurement robot can be effectively used so that measuring and machining are carried out in parallel.

JP 2011-045988 A discloses a capturing means arranged in a machine tool, and a means for correcting a processing position of a cutting tool by calculating an amount of abrasion and an amount of displacement of the cutting tool based on image data obtained by capturing the cutting tool.

Further, JP 2001-150299 A discloses a tool life management device having: a keyboard for setting a life length of a tool; a measurement probe for measuring a length of a tool attached to a machine tool; a CPU for judging a life of the tool based on the set life length and the measured tool length; and a CRT for displaying life information of the tool based on the judgment result of the CPU.

In the conventional machine tool, it is not realized that the amount of abrasion of the tool is recognized in the machine tool so as to automatically correct the processing program. One of the reasons therefor is that it is difficult to arrange a sensor such as an image processor and a contact sensor, etc., for measuring the amount of abrasion of the tool, while assuring reliability of the sensor, under an environment in which cutting fluid always pours on the sensor.

Therefore, in the conventional method, an allowable amount of abrasion (or a life) of the tool is predetermined within a functionally allowable error range, and the tool is replaced with a new tool when the actual amount of abrasion of the tool reaches the allowable amount of abrasion. Therefore, processing accuracy is deteriorated with time, and in the worst case, processing defect may occur at the time when the tool almost comes to the end of its life, whereby the processed workpiece cannot be used. In addition, the degree of abrasion and the life of the tool may be significantly varied depending on the material of the workpiece and the cutting condition, and thus it is difficult to precisely calculate the life of the tool unless the processing is actually carried out.

In the technique of JP H09-085584 A or JP 2002-018680 A, the image of the tool is not obtained by the robot, and the processing program of the machine tool is not corrected. Also, in the technique of JP H10-096616 A, the processing program is not corrected.

In the invention of JP H07-156067 A, the motion program of the robot, which is different from the processing program of the machine tool, is corrected. Further, in the invention of JP 2014-075050 A, although the image of the workpiece to be processed is obtained, the image of the tool is not obtained.

The technique of JP 2011-045988 is intended to correct the processing position of the processing tool, but is not intended to use the robot. Further, although JP 2001-150299 A describes that the life information of the tool is displayed, this document does not mention the calculation of remaining possible processing time or a number of remaining possible processing operations for the tool.

SUMMARY OF THE INVENTION

Therefore, an object of the present invention is to provide a processing system having a function for appropriately maintain processing accuracy without depending on a degree of abrasion of a tool.

The present invention provides a processing system including a machine tool, a robot which supplies or ejects a workpiece to or from the machine tool, and a capturing device which is arranged on a movable section of the robot and captures a tool of the machine tool, the processing system comprising: an image processing part which compares a reference image of the tool captured by the capturing device to an image of the tool captured by the capturing device at each time when a predetermined number of processing operations are finished, and detects an amount of abrasion of the tool; a correcting part which corrects a tool position in a processing program of the machine tool based on the amount of abrasion; and an outputting part which calculates a number of remaining possible processing operations until the amount of abrasion reaches a predetermined limit amount of abrasion of the tool, based on an amount of tool abrasion per one processing operation, and externally outputs the calculated number of remaining possible processing operations.

The present invention also provides a processing system including a machine tool, a robot which supplies or ejects a workpiece to or from the machine tool, and a capturing device which is arranged on a movable section of the robot and captures a tool of the machine tool, the processing system comprising: an image processing part which compares a reference image of the tool captured by the capturing device to an image of the tool captured by the capturing device at each time when a predetermined processing time has elapsed, and detects an amount of abrasion of the tool; a correcting part which corrects a tool position in a processing program of the machine tool based on the amount of abrasion; and an outputting part which calculates a remaining possible processing time until the amount of abrasion reaches a predetermined limit amount of abrasion of the tool, based on an amount of tool abrasion per unit processing time, and externally outputs the calculated remaining possible processing time.

In a preferred embodiment, when a difference between an estimated amount of tool abrasion and an actually measured amount of tool abrasion at a predetermined timing of capturing the tool exceeds a predetermined allowable value, the outputting part estimates and outputs a remaining tool life by replacing the estimated amount of tool abrasion with the actually measured amount of tool abrasion, the estimated amount of tool abrasion being obtained by estimating based on the amount of tool abrasion obtained by comparing the reference image of the tool to the image of the tool at the time when the predetermined number of processing operations are finished or the predetermined processing time has elapsed, and the actually measured amount of tool abrasion being obtained by a captured image at the time when the predetermined number of processing operations are finished or the predetermined processing time has elapsed.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 2 is a flowchart showing an example of a processing procedure in the processing system of FIG. 1;

FIG. 3 is a flowchart showing an example of a procedure for correcting a processing program in the processing system of FIG. 1;

FIGS. 4a and 4b are views explaining an example in which the shape of a processing tool of a machine tool is varied due to abrasion; and FIG. 5 is a flowchart showing an example of a procedure for outputting a tool life in the processing system of FIG. 1.

DETAILED DESCRIPTIONS

Figure 1:
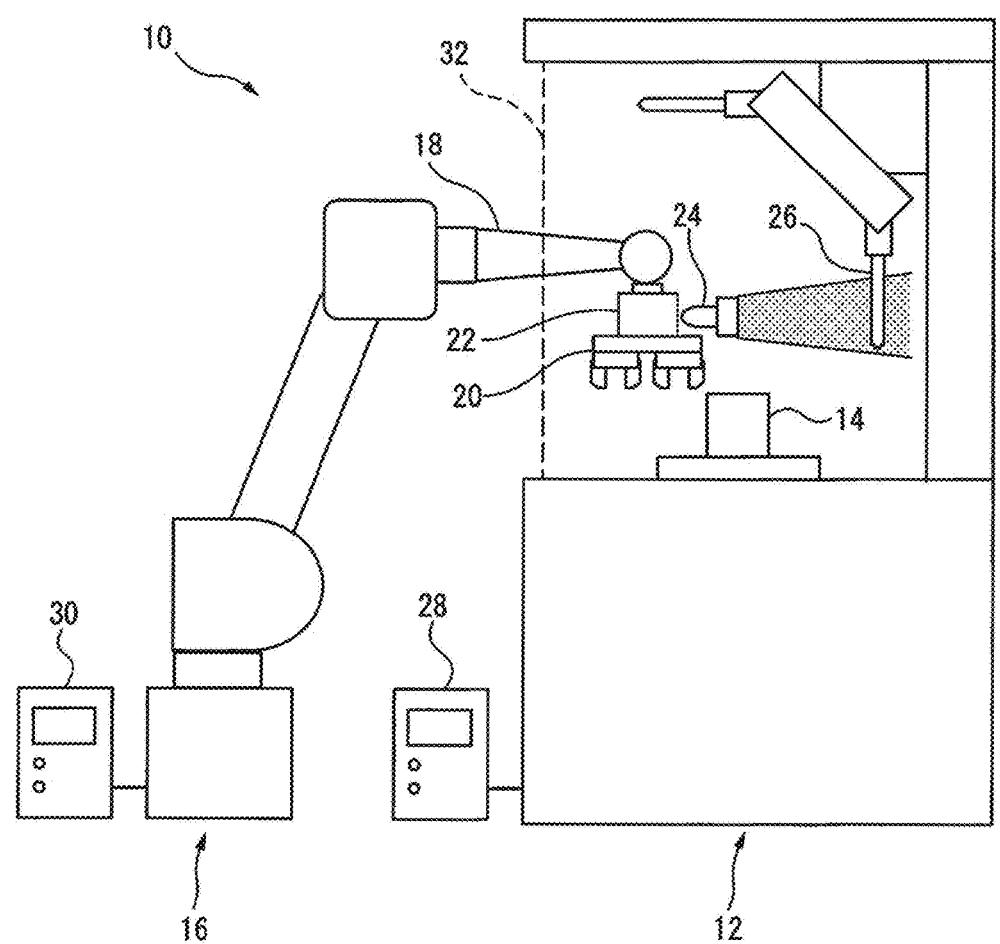
FIG. 1 is a schematic view showing an embodiment of a processing system according to the present invention.

FIG. 1 is a schematic view showing a configuration of a processing system 10 according to an embodiment of the present invention. Processing system 10 includes a machine tool 12 such as a numerical controlled machine tool (viewed from the lateral side thereof), and a robot 16 which supplies or ejects a workpiece 14 to or from machine tool 12. For example, robot 16 is a multi-joint robot having six axes, and has a robot arm 18, and a hand 20 attached to a front end of robot arm 18 and configured to grip workpiece 14, and thus robot 16 is configured to supply a workpiece to be processed by machine tool 12 and eject the workpiece processed by machine tool 12. In the illustrated embodiment, hand 20 is a double hand having two chucks.

Robot 16 has a capturing device 24 such as a camera arranged on a movable section of robot 16 (for example, robot arm 18 or a wrist 22 to which hand 20 is attached), and thus robot 16 is configured to capture a processing tool 26 of machine tool 12 and measure the shape of processing tool 26.

As shown in FIG. 1, machine tool 12 is controlled by a machine tool controller 28, and machine tool controller 28 has functions for correcting a processing program and externally outputting (or displaying) a tool life as explained below. On the other hand, robot 16 is controlled by a robot controller 30, and robot controller 30 has a function for processing an image of the tool, etc., as explained below. Machine tool controller 28 and robot controller 30 can communicate with each other, so that data necessary for a procedure described below can be transmitted between the controllers at a proper timing. In this regard, the correcting function (or a correcting part), the externally outputting function (or an externally outputting part) and the image processing function (or an image processing part) as described above may be provided to a device other than machine tool controller 28 or robot controller 30.

As shown in FIG. 1, robot 16 is positioned in the vicinity of machine tool 12. After the processing or machining of the workpiece in machine tool 12 is finished, a door (roughly indicated by a dashed line 32) of machine tool 12 is opened, so that robot 16 (in particular, hand 20 and vision sensor 24 of robot 16) can access the inside of machine tool 12. Hand 20 can effectively carry out a preparation work during the workpiece is processed. For example, during the workpiece is processed, hand 20 can move a processed workpiece to a predetermined place and can grip an unprocessed workpiece so that the workpiece can be rapidly replaced with the unprocessed workpiece after the processing of the workpiece is finished.

Since robot 16 is positioned outside machine tool 12, robot arm 18 can be appropriately operated (or moved) so that cutting fluid used in machine tool 12 is not poured on capturing device (camera) 24 mounted on wrist 22 of robot 16. Therefore, it is not necessary to provide capturing device 24 with a waterproof mechanism or a lens cleaning means to capturing device 24, and thus capturing device 24 can have a relatively simple structure. Further, by arranging camera 24 on the movable section of robot 16, a degree of freedom with respect to the capturing direction can be improved, and moreover, the tool can be captured between when workpiece 14 is loaded and unloaded, whereby the efficiency of the processing system can be improved.

Next, an example of a procedure in processing system 10 will be explained with reference to a flowchart of FIG. 2. First, after the processing of a workpiece is started in machine tool 12, robot 16 grips an unprocessed workpiece to be processed by machine tool 12 next time by using one of the two chucks (or a first chuck) of hand 20, and then waits until the processing of the current workpiece in machine tool 12 is finished (step S1). At this time, the other chuck (or a second chuck) of hand 20 does not grip any article. After the processing in machine tool 12 is finished, door 32 of machine tool 12 is opened (step S2), and then robot 16 convey the unprocessed workpiece into machine tool 12 (step S3).

In the next step S4, the processed workpiece is taken out from machine tool 12 (concretely, from a chuck of machine tool 12 for holding the workpiece) by using the second chuck of hand 20. Then, the unprocessed workpiece conveyed by robot 16 is set to machine tool 12 (concretely, is held and fixed by the chuck of machine tool 12) (step S5).

In the next step S6, processing tool 26 such as a drill is captured by using camera 24 mounted on robot 16, and the shape of the tool is detected by image processing, etc. Then, robot arm 18 of robot 16 is moved away from a processing area of machine tool 12 (step S7), and machine tool 12 closes door 32 and starts processing of the next workpiece (step S8). Then, robot 16 conveys the processed workpiece taken out from machine tool 12 conveys to a predetermined place and stores the workpiece thereto (step S9).

Next, an example of a procedure for correcting the processing program of machine tool 12 will be explained with reference to FIGS. 3 to 4b. First, in step S11, it is judged as to whether or not the number of processing after the latest capturing of processing tool 26 by camera 24 reaches a predetermined number. In this embodiment, the predetermined number is set to ten.

When the number of processing operations (or the number of the processed workpiece) reaches the predetermined number, (the shape of) processing tool 26 is captured by camera 24 (step S12). FIGS. 4a and 4b exemplify the shape (image) of processing tool 26 obtained as such. Concretely, a shape 26a of the tool as shown in FIG. 4a is changed to a shape 26b as shown in FIG. 4b, due to abrasion.

In the next step S13, by comparing former captured image (or tool shape) 26a to latter captured image (or tool shape) 26b, an amount of abrasion of the tool due to the predetermined number (in this case, ten) of processing operations is calculated. Next, by dividing the calculated amount of tool abrasion by the predetermined number (ten), an average amount of tool abrasion per one processing operation is calculated (step S14).

In the next step S15, by using the average amount of tool abrasion obtained in step S14, the processing program of machine tool 12 is corrected each time when one processing operation is finished. Concretely, every time when the processing of one workpiece is finished, the position of the tool is corrected so as to approach the workpiece by a distance corresponding to the amount of tool abrasion due to the processing of one workpiece. By carrying out the processing operation of next workpiece (step S16) after the correction of the tool position, each workpiece can be processed without misalignment of the processing position of the workpiece due to the abrasion, whereby the high processing accuracy can always be obtained even when the tool is actually considerably abraded.

On the other hand, when the number of processing operations does not reach the predetermined number in step S11, the procedure progresses to step S15 so as to correct the processing program by using the last calculated average amount of abrasion.

As explained above, in the present invention, by comparing the vision data of the tool between before and after the predetermined number of processing operations have been carried out, the amount of tool abrasion can be calculated, and further, the average amount of tool abrasion per one processing operation can be calculated by dividing the amount of tool abrasion by the predetermined number. After each processing operation is carried out, by correcting the position or trajectory of the processing tool in the processing program (by the controller, etc., of machine tool 12) by using the data of the calculated average amount of abrasion, the high processing accuracy can be maintained.

In the above embodiment, the processing tool is captured each time when the ten processing operations have been carried out. However, the predetermined number may be a number other than ten. In this regard, when a relatively small number is determined as the predetermined number, estimation accuracy of the amount of abrasion is increased, whereas the amount of abrasion per one processing is small, and thus it is difficult to precisely measure the tool abrasion. Therefore, the predetermined number may be appropriately determined or changed by considering a balance between the estimation accuracy of the amount of abrasion and the measurement accuracy of the vision sensor, and by considering the tool shape and the processing condition, etc.

In addition, the timing of capturing of the tool may be after a predetermined processing time (or a time in which the workpieces are actually processed by the tool) has elapsed, as well as after the predetermined number of processing operations have been carried out. In this case, an average amount of tool abrasion per unit processing time can be calculated. The processing time may also be appropriately determined by considering the balance between the estimation accuracy of the amount of abrasion and the measurement accuracy of the vision sensor, for example, may be determined as thirty minutes, one hour, or two hours, etc.

Next, with reference to FIG. 5, the procedure for externally outputting a life of processing tool 26 of machine tool 12 will be explained. First, in step S21, a new (unused) processing tool is set to machine tool 12, and a limit amount of abrasion is input as a value for quantitatively representing a tool life (step S22). For example, the limit amount of abrasion may be experimentally determined, and may be input to machine tool controller 28, etc., by the user by using a suitable input means.

In the next step S23, (the shape of) the unused processing tool is captured by camera 24, so that the captured image (image data) of the tool is obtained as a reference image. Next, in step S24, the predetermined number (in this case, ten) of processing operations are carried out, and then the shape of the tool is captured so as to obtain a captured image (step S25).

In the next step S26, similarly to step S14 of FIG. 3, by comparing the captured image (or the tool shape) after the predetermined number of processing to the reference captured image (or the tool shape), an amount of abrasion of the tool due to the predetermined number (in this case, ten) of processing operations is calculated, and then, by dividing the calculated amount of tool abrasion by the predetermined number (ten), an average amount of tool abrasion per one processing operation is calculated. Next, based on the captured image of the tool obtained in step S25, the average amount of abrasion calculated in step S26, and a number of processing operations carried out after the capturing in step S25 (see step S29 explained below), a current amount of tool abrasion is estimated (step S27). Then, in the next step S28, based on the limit amount of abrasion input in Step S22 and the estimation result in step S27, a number of remaining possible processing operations for the tool in use is calculated, and the calculation result is output so that the user, etc., can recognize the calculation result.

The procedures in steps S27 and S28 are repeated until the predetermined number (in this case, ten) of processing operations are carried out after the capturing of the tool in step S25 (step S29). In the next step S30, the tool shape is captured again by the vision sensor, and then this capturing result is compared to the capturing result in step S25, whereby an actual amount of tool abrasion can be calculated.

In the next step S31, the actual amount of abrasion (or the actually measured amount of tool abrasion) calculated in step S30 is compared to the estimated value of the amount of abrasion (or the estimated amount of tool abrasion) calculated in step S27. Then, when the difference therebetween exceeds a predetermined allowable value (for example, when a change in dimension of the tool exceeds 0.1 mm), the estimated value is replaced with the actually measured value, and then the procedure progresses to step S26 (steps S31 and S32).

In other words, in the example of FIG. 5, the life of tool cannot be estimated until ten processing operations are carried out after a new tool is set. However, by capturing the tool shape after the ten processing operations are carried out and by comparing the captured image to an image of new tool so as to calculate the amount of tool abrasion due to the ten processing operations, the life of the tool can be appropriately estimated. Further, by using the limit amount of abrasion and the current amount of abrasion, the number of remaining possible processing operations can be output as the tool life. Therefore, the user can clearly understand how many processing operations can be carried out by the current tool, and thus a production schedule of the system can be easily prepared.

In the embodiment, "the predetermined number" of processing operations needs to be one or more (preferably, two or more), the predetermined number needs not to be a constant value. For example, in case that the tool life is to be estimated as soon as possible, the predetermined number may be set to a relatively small value (such as two or three) only immediately after the tool is replaced with new one, and after that, the predetermined number may be set to ten. As such, the user can freely set the predetermined number.

In some cases, the difference between the estimated amount of abrasion and the actual amount of abrasion is not negligible, due to a disturbance factor such as a shortage of cutting fluid used in the machine tool, etc. In such a case, the estimated amount of abrasion and the actual amount of abrasion are compared at certain timing, and when they do not coincide with each other within a predetermined error range, the estimated amount of abrasion is replaced with the actual amount of abrasion. By virtue of this, the estimation accuracy of the tool life can be improved.

In the example of FIG. 5, similarly to the example of FIGS. 4a and 4b, the procedure may use the predetermined processing time instead of the predetermined number of processing operations. In this case, the processing or machining is carried out by the predetermined time such as thirty minutes, one hour or two hours in step S24, and the average amount of tool abrasion per unit processing time is calculated in step S26. Further, the remaining possible processing time is calculated and output in step S28, and then, in step S29, it is judged as to whether or not the processing is carried out for the predetermined time from step S25. In this regard, the basic concept of the invention is the same between the case using the processing time and the case using the number of processing operations.

The tool life may be determined by the user, and it is preferable that the tool life be determined as a value having a certain degree of margin. When the tool comes to the end of its life, this information may be displayed on a control section of the machine tool. Further, the system may have a setting in which the next processing cannot be performed unless the tool which comes to the end of its life is replaced with new one and a predetermined operation is finished. By virtue of this, a processing defect due to the processing by the considerably abraded tool can be avoided.

In the above embodiment, the robot is positioned in the vicinity of the machine tool, the robot has the capturing device as well as the hand for loading/unloading the workpiece, and the tool is directly captured by the capturing device. Next, the reference tool image (for example, the latest captured tool image) and the current tool image immediately after the processing is finished are compared to each other so as to calculate the amount of tool abrasion, and then the processing program is automatically corrected by using the amount of abrasion so as to carry out the next processing. Further, the number of remaining possible processing operations (or the remaining processing time) is calculated and the calculated number or time is output (e.g., displayed) so that the user can recognize it. Therefore, the user can correctly understand the most important factor for effectively improving the productivity of the system i.e., the number of workpieces capable of being processed by a selected tool under a determined cutting condition, without generating the processing defect.

Also in the prior art, it has been proposed that the amount of tool abrasion is monitored and it is output as to whether or not the tool comes to the end of its life, in order to effectively carry out maintenance of the tool. However, it is more useful for the user when the number of remaining processing operations, capable of being carryout out without generating the production defect, is displayed, in order to maximize the productivity and prepare a production schedule. Further, even when the same tool is used, the tool life will significantly vary depending on the cutting condition such as the cutting velocity and/or the type of cutting fluid. Therefore, when the number of remaining possible processing operations or the possible processing time is output along with information such as the predetermined cutting velocity, and the types of the cutting fluid and the workpiece, the user can easily understand a causal relationship between the various conditions, can easily manage a production volume of the workpieces, and can easily prepare a production schedule.

Further, by estimating and outputting the number of possible remaining processing operations or the possible processing time of the tool until the amount of tool abrasion reaches the limit amount of abrasion previously set by the user, the user can be informed of a rough date and time for exchanging the tool. Therefore, the user can previously prepare a spare tool, and determine man-hours and/or timing for the exchanging, whereby the productivity of the system can be improved while reducing a downtime of the system.

In addition, when the estimated amount of tool abrasion after a certain period of time from a new tool is started to be used does not coincide with the actual amount of tool abrasion at the same time calculated from a captured image of the tool, the program may be corrected by replacing the estimated amount of abrasion with the actual amount of abrasion, whereby the tool life can be precisely estimated even if the abnormal abrasion occurs due to unexpected disturbance. Further, since it is necessary to capture and store the tool image every time when each processing operation is finished, a cycle time per one cycle of processing can be reduced, and a high-capacity memory is not necessary.

According to the present invention, even when the tool is considerably abraded with time, the processing accuracy can be highly maintained until just before the tool comes to the end of its life. Since the program can be corrected by using the actual amount of tool abrasion, the program can be corrected while considering variability of the amount of abrasion between each processing operation. Further, since the number of workpieces capable of being processed by the current tool or the tool life can be previously learned, the production volume of the workpieces can be precisely managed, and thus the user can previously plan or calculate man-hours and/or components required for the tool exchanging, whereby the productivity of the system can be improved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A processing system, comprising:
   a machine tool;
   a robot which has a movable section configured to supply or eject a workpiece to or from the machine tool and to be moved away from a processing area of the machine tool while the workpiece is processed by the machine tool;
   a capturing device which is arranged on the movable section of the robot and captures a tool of the machine tool;
   an image processing part which compares a reference image of the tool captured by the capturing device to an image of the tool captured by the capturing device at each time when a predetermined number of processing operations are finished, and detects an amount of abrasion of the tool;
   a correcting part which corrects a tool position in a processing program of the machine tool based on the amount of abrasion; and
   an outputting part which calculates a number of remaining possible processing operations until the amount of abrasion reaches a predetermined limit amount of abrasion of the tool, based on an amount of tool abrasion per one processing operation, and externally outputs the calculated number of remaining possible processing operations.

2. A processing system, comprising:
   a machine tool;
   a robot which has a movable section configured to supply or eject a workpiece to or from the machine tool and to be moved away from a processing area of the machine tool while the workpiece is processed by the machine tool;
   a capturing device which is arranged on the movable section of the robot and captures a tool of the machine tool;
   an image processing part which compares a reference image of the tool captured by the capturing device to an image of the tool captured by the capturing device at each time when a predetermined processing time has elapsed, and detects an amount of abrasion of the tool;
   a correcting part which corrects a tool position in a processing program of the machine tool based on the amount of abrasion; and
   an outputting part which calculates a remaining possible processing time until the amount of abrasion reaches a predetermined limit amount of abrasion of the tool, based on an amount of tool abrasion per unit processing time, and externally outputs the calculated remaining possible processing time.

3. The processing system as set forth in claim 1, wherein, when a difference between an estimated amount of tool abrasion and an actually measured amount of tool abrasion at a predetermined timing of capturing the tool exceeds a predetermined allowable value, the outputting part estimates and outputs a remaining tool life by replacing the estimated amount of tool abrasion with the actually measured amount of tool abrasion, the estimated amount of tool abrasion being obtained by estimating based on the amount of tool abrasion obtained by comparing the reference image of the tool to the image of the tool at the time when the predetermined number of processing operations are finished , and the actually measured amount of tool abrasion being obtained by a captured image at the time when the predetermined number of processing operations are finished.

4. The processing system as set forth in claim 2, wherein, when a difference between an estimated amount of tool abrasion and an actually measured amount of tool abrasion at a predetermined timing of capturing the tool exceeds a predetermined allowable value, the outputting part estimates and outputs a remaining tool life by replacing the estimated amount of tool abrasion with the actually measured amount of tool abrasion, the estimated amount of tool abrasion being obtained by estimating based on the amount of tool abrasion obtained by comparing the reference image of the tool to the image of the tool at the time when the predetermined processing time has elapsed, and the actually measured amount of tool abrasion being obtained by a captured image at the time when the predetermined processing time has elapsed.

5. The processing system of claim 1, wherein
   the machine tool uses cutting fluid, and
   the movable section of the robot with the capturing device arranged thereon is movable to prevent the cutting fluid from pouring on the capturing device.

6. The processing system of claim 1, wherein
   the capturing device is configured to capture the tool between when a workpiece is loaded and when the workpiece is unloaded.

7. The processing system of claim 1, wherein
   the outputting part is configured to output the calculated number of remaining possible processing operations along with at least one of a cutting velocity, a type of the cutting fluid, and a type of the workpiece.

* * * * *